United States Patent [19]

Stiehl

[11] 4,225,328
[45] Sep. 30, 1980

[54] EXCHANGEABLE FILTER ELEMENT

[75] Inventor: Hans-Henrich Stiehl, Berlin, Fed. Rep. of Germany

[73] Assignee: Delbag-Luftfilter GmbH, Berlin, Fed. Rep. of Germany

[21] Appl. No.: 953,467

[22] Filed: Oct. 23, 1978

[30] Foreign Application Priority Data

Nov. 17, 1977 [DE] Fed. Rep. of Germany ....... 2751640

[51] Int. Cl.² ............................................. B01D 46/02
[52] U.S. Cl. .......................................... 55/378; 55/96;
   55/380; 55/483; 55/497; 55/502; 55/521;
   176/14
[58] Field of Search ............................. 55/96, 378–382,
   55/483, 484, 492, 497, 499, 500, 502, 521;
   176/12, 14, 16, 37

[56] References Cited

U.S. PATENT DOCUMENTS

| 1,830,096 | 11/1931 | Dollinger ........................... 55/379 X |
| 3,217,472 | 11/1965 | Babbitt et al. ...................... 55/484 X |
| 3,830,042 | 8/1974 | MacDonnell ...................... 55/497 X |
| 4,080,185 | 3/1978 | Richter et al. ..................... 55/500 X |

FOREIGN PATENT DOCUMENTS

| 2020246 | 11/1971 | Fed. Rep. of Germany ............. 55/379 |
| 6608707 | 11/1971 | Fed. Rep. of Germany ............. 55/379 |
| 3948 | of 1913 | United Kingdom ..................... 55/379 |

Primary Examiner—Richard L. Chiesa

[57] ABSTRACT

An exchangeable filter element is disclosed. The filter element is especially adapted for nuclear installations for the purification of gas streams which contain toxic or radioactive matter. A method is also disclosed for the exchange and disposal of contaminated filter elements, which filter elements are reducible in volume for packing into waste containers.

7 Claims, 10 Drawing Figures

Fig.1
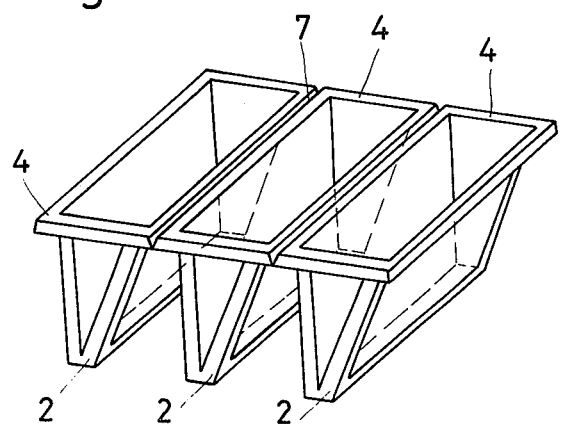
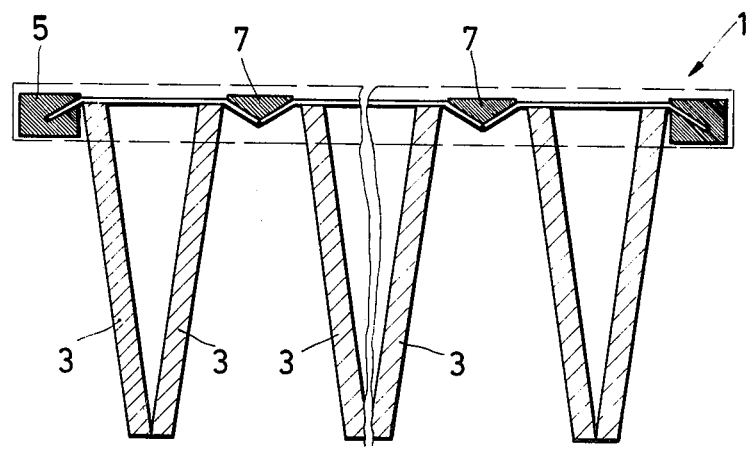
Fig.2

EXCHANGEABLE FILTER ELEMENT

BACKGROUND OF THE INVENTION

I. Field of the Invention

The present invention is concerned with exchangeable filter elements for use in nuclear installations for the purification of airstreams or gas streams which contain toxic or radioactive dust. The invention is furthermore concerned with a method for the exchange and disposal of the filter elements.

II. Description of the Prior Art

In existing nuclear installations the operating air must be purified and materials which are dangerous to health, such as toxic or radioactive matter, must be separated therefrom. This is accomplished in special filter installations which are equipped with filter elements which remove suspended matter that is dangerous to health. A special problem with regards to environmental protection is the necessary exchange of the contaminated elements and their disposal. This must be accomplished without creating the danger of contamination especially for the personnel who are concerned with the exchange.

The filter elements for suspended matter which were used for such purposes usually consisted of a filter layer for suspended matter which was formed by the folding of suitable paper in a zig-zag shape. This filter layer is mounted in a rectangular- or square-shaped frame and sealed with a sealant.

These filter elements which consist of a frame and the filter medium are, for instance, inserted into a housing which is connected to an air duct where the circumferential edge of the rigid filter element frame is kept in tight contact by means of tightening devices with a tightening area located inside the housing, in such a way that the air which should be purified must necessarily pass the filter layer without bypass. In this case the filter element is introduced from the side, through an opening which is located in the housing, and which opening can be closed air tight by means of a door or a lid which can be flipped down. The exchange of the contaminated filter element is carried out by employing the so-called "protective bag technique". In this arrangement the filter element to be exchanged is pulled into a bag, which bag is connected to the housing and where the filter element is sealed in by sealing off the protective bag. For the introduction of a new filter element, a second protective bag is attached at the housing and the remainder of the first protective bag is pulled into the second protective bag, whereupon the new filter element can be introduced into the corresponding housing. The final disposal of the contaminated filter elements, which are sealed in the protective bag, is very expensive and time consuming because of the existing danger for the operating personnel and for the environment. The compaction of the filter elements is carried out employing impact mills, shredder installations and saws. Compacting presses are used to achieve an appropriate compacting. These operational steps are carried out in a protective atmosphere as distinguished from the breathing air. This is also necessary for the further handling and control of these machines. The remainder of the filter elements, which are very contaminated and which were treated in this way, must then be put into standardized, drum-shaped waste containers, which waste containers are then stored in inaccessable or protected places, such as subterranean storage places.

Since the square-shaped known standardized filter elements do not fit into the waste containers or only partially fill these waste containers, they must be compacted, using the protective devices which were described above before they are put into these containers. Compacting is necessary in order to achieve optimum, economic utilization of the waste container volume for the purpose of cost reduction. After the compaction has been achieved the remainder of the contaminated filter elements are put into the drum-shaped waste container until the container is approximately filled. Then the waste containers are closed air tight and are transported to the final storage areas.

In order to reduce the danger of damage to the protective bag by means of the rigid filter element frame and especially by means of the corners and edges of the rigid element frame, a rectangular or square filter cell with rounded edges is disclosed (West German Patent No. DBGM 6 608 707) where the filter element, which consists of filter paper which is folded in a zig-zag shape, is located in an inner frame. The frame may be reused. The filter is in a frame at the air entrance and at the air exit, tightly connected with the outer frame by means of a plastic seal and by means of an adhesive tape which is equipped with a tear string. In case of an exchange of the filter element, the outer frame with the filter element must be received in a sealed, protective bag, whereupon in the protective bag the filter paper element is released from the rigid outer frame by pulling off at the tear. When inside the protective bag, the filter element must be pulled out of the outer frame and the protective bag must be sealed off and separated from the outer frame. In this way the rigid outer frame, after it has been decontaminated, can again be used and can be equipped with a fresh filter element; however, the necessary decontamination of the outer frame is rather time consuming. In addition, even this compressible filter element must be compressed by means of breaking, cutting or sawing or pressing before it is put into the waste container, since it cannot be compressed in a simple manner. This necessitates, at first, storage of the filter elements in their safe conditions with the appropriate expense prior to the necessary compaction work and disposal work. For this filter element the treatment, which has been described above, is complicated, expensive and time consuming and necessitates extensive safety measures.

III. Prior Art Statement

In the opinion of the applicant, the above-mentioned prior art represents the most pertinent and relevant prior art of which applicant is aware.

SUMMARY OF THE INVENTION

The present invention comprises a rigid outer frame and a compressible filter paper element which is received in the outer frame and removed from the outer frame in such a way that the filter element can be compacted. This may be accomplished by bending the individual filter bag into a small size so that it will exactly fit in the inner circumference of the waste container. It can be put into the waste container and be reduced in volume by means of a radial pressing motion directly at the place where the filter is changed and without endangering the environment. The rigid constructable frame, which receives the filter element, remains in the housing without having to be stored and decontaminated. In nis way the structural frame can again be used, the necessary exchange time and exposure time at the filter for the operating personnel is reduced to a minimum and the costly preparation, which was necessary to date for the disposal of the filter, is substantially reduced.

This problem is solved in accordance with the invention by using a filter element consisting of a plurality of V-shaped filter pockets which are individually located side by side. The flanges of these filter pockets, which surround their open side, are connected with each other in a removable or break-away fashion. The flanges of all V-shaped pockets are tightly enclosed by a common elastic material which will break under pressure, such as a mounting frame made from a pliable plastic. The mounting frame is inserted with its circumferential edge and by means of an embedded soft gasket tightly between the top of the receiving frame which is loosely inserted into the housing and the upper inner contact area of the housing. Due to the fact that the filter elements consist of separable V-shaped filter pockets, the filter elements can be pressed together sideways without a substantial effort after they have been received in a protective bag such that the pointed ends of the V-shaped filter layer come in contact with each other. In this way a circle-shaped object of variable size is formed, depending on the number of the V-shaped filter pockets, which circle-shaped object can be inserted in the drum-shaped receiving container. The circle-shaped object adapts itself to the inner circle-shaped circumference of the drum-shaped receiving container. If the number of the V-shaped filter pockets of the filter element is so large that a circular object is formed that does not correspond to the inner circumference of the waste container, one or more filter pockets can be broken off within the protective bag and can be located in the middle of the circle-shaped filter object. In order to facilitate a tightly fitting insertion into the waste container, the filter element that has been put into the waste container in this way and which has the dimensions of, for instance, 610±222 milimeters is reduced in its volume by approximately one third by means of pressure from a press in the direction of the opening of the container from top to bottom. In this way at least four filter elements, one on top of the other, can be put into a waste container of, for instance, 200 liter capacity and one after the other can be reduced in volume by means of pressure. In this way the filter elements will completely fill the continer and, after the filling of the waste container is completed, it can be closed gas tight in the usual manner. The upper mounting frame of the flexible filter element is equipped with a gasket and is positioned at the top of the loose, rigid structural receiving frame whereupon the tightening element of the filter housing, which is located below the structural receiving frame, can push and tighten the receiving frame against the tightening area of the housing. The tightening mounting frame of the V-shaped filter pockets of the filter element is positioned between the receiving and the tightening area of the housing. Since the toxic or radioactive matter is received in the suspended V-shaped filter pockets which are closed at the bottom, they cannot come in contact with the receiving frame. Thus, a decontamination of the receiving frame is not necessary for each exchange of the filter element but only for a general cleaning.

The invention is furthermore characterized by the fact that the filter pockets show two layers of filter paper which are folded in a zig-zag fashion with a thickness of 10–40 milimeters. The folds are sealed and embedded with a sealant with their edges which form the open side of the pockets and which are closed at their opposite ends and which touch each other by a common edge, which is formed with an elastic sealant; and that the side areas of the filter pockets are closed with a sealant by means of a V-shaped support, which is filled with a plastic material and which V-shaped support consists of a perforated sheet of metal, expanded metal or cardboard or an elastic sheet of plastic or a similar material. The material is tightly embedded in the flange of the filter pocket which closes the edges of those filter pockets. Due to these provisions which are in accordance with the invention, the edges of the paper filter layers which form the sides of the filter pockets are embedded in plastic in their entire circumference in such a way that closed elastic and easily shapeable filter pockets result, the handling of which is not difficult even when it is done in a transparent bag.

It is furthermore characterized that both sides of the filter layers of the filter pockets are equipped with a perforated protective cover made from a perforated sheet of metal or similar material, the edges of which protective cover are embedded by bending in the sealant of the flanges and the V-shaped support. The perforated protective covers on both sides of the filter layers of the filter pockets prevent damage to the sensitive paper filter layers due to touching during the manufacturing and the later handling of the filter elements during the exchange and, in addition, they serve to achieve a sufficient stiffness of the filter element without influencing the elastic shapability and removability from each other in a disadvantageous way.

By means of the sealant strips which are located on the touching edges of the flanges of the filter pockets and which are, for instance, equipped with a known tear tape, the individual filter pockets can be separated from each other by operating the tear lines in such a way that, even in the case of a larger number of filter pockets of a connected filter element, an approximately circle-shaped object can be achieved by shaping inside the protective bag, which circle-shaped object is approximately in its circumference the inner circumference of the drum-shaped receiving container. The same is achieved by the V-shaped separating joints or grooves which are filled with an elastic sealant and which are located between the individual filter pockets.

The invention is furthermore characterized by the fact that the structural receiving frame of the filter element is constructed in the shape of an open box, the frontal part of which open box is constructed in such a way that it can be flipped down like a hinge from top to bottom for the insertion of the filter element.

The invention is furthermore characterized by the flipping of a side brace of the receiving frame which is made of structural metal. In this way the filter element can be inserted into the receiving frame without any effort and whereby its tightening edge contacts the upper circumventing edge of the closed structural receiving frame. After the insertion of the filter element, the side brace is again flipped back and is locked in position. The structural frame for the reception of the filter element remains always in the filter receiving housing during this operation.

The method for the exchange and for the waste disposal of the filter element is carried out by employing the protective bag technique, which was described in the main conception; and it is characterized by the fact that, before the protective bag which contains the used filter element is put into the waste container, the filter element in the protective bag can be adapted to the inner circumference of the drum-shaped container by bending or breaking or tearing off the tear strings of all filter pockets or off individual filter pockets in such a way that it almost fills the container; and that subsequently the reduction of the volume of the filter element is achieved by vertical pressure exerted by a press directly in the waste container. However, the used filter element can directly, after putting it into the enclosing protective bag and before putting it into waste container, be shaped to form a circular object in such a way that it will fit to the inner circumference of the drum-shaped waste container, whereupon the reduction of the volume by means of a press can also be carried out in the waste container.

Another characteristic of the method consists in the fact that the filter element with the receiving frame is pulled out of the housing into a protective bag. The filter element in the protective bag is pulled out of the receiving frame in a known fashion and is separated and sealed off from it and is disposed of; and that a new protective bag which contains a new filter element is attached to the housing. The remainder of the bag which contains the receiving frame is pulled off the housing, the filter element is inserted into the receiving frame and the receiving frame with the filter element together is again put into the housing.

A part of the method which is modified and substantially simplified is characterized by the fact that the structural receiving frame, which is connected with the tightening device of the filter receiving housing, remains during the exchange of the filter element in the frame which can be flipped down and all the filter elements are exchanged employing the protective bag technique.

BRIEF DESCRIPTION OF THE DRAWINGS

The attached drawings show examples of versions of the invention, and the following is shown:

FIG. 1 is a schematic view of three filter pockets which are located side by side with sealant grooves or separating joints which are provided between these filter pockets;

FIG. 2 is a cross-section of a finished filter element with a mounting frame which includes its filter pockets and with elastic plastic material which was put into the grooves or V-shaped joints;

DESCRIPTION OF THE PREFERRED EMBODIMENTS

Figure 3:
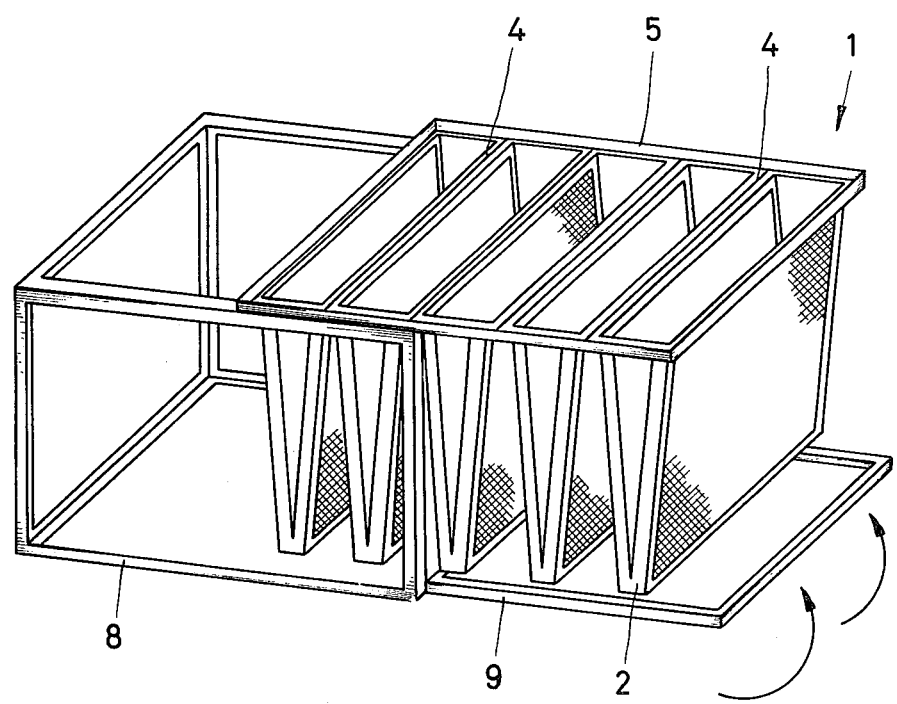
FIG. 3 is a view of a filter element which is constructed of five filter pockets and which is half way pulled out of the receiving frame and its receiving frame with shaped down frontal section.

FIG. 1 shows three V-shaped filter pockets 2 which are located side by side, the open sides of which filter pockets 2 are each surrounded with a flange 4 where between each two adjacent pocket filters 2 a V-shaped groove or separating joint is formed.

FIG. 2 shows a schematic view of a cross-section of a filter element 1 which was formed from the filter pockets 2 where the grooves or separating joints are shown with a plastic sealant material 7, and the filter element 1 is enclosed by a self-sealing mounting frame 5, which will be described later.

FIG. 3 shows a filter element 1 which was formed of five filter pockets 2 with flanges 4, the enclosing mounting frame 5 and a box-shaped receiving frame 8 which is open at the top and the bottom and is equipped with side walls 9. One of the side walls 9 is shown in a flipped-down condition in order to insert the filter element 1 into the receiving frame 8. The mounting frame 5 of the filter element 1 contacts the upper perforated edge of the receiving frame 8 and, after completed insertion of the filter element 1 into the receiving frame 8, the side wall 9 is closed in the direction of the arrow.

Figure 4:
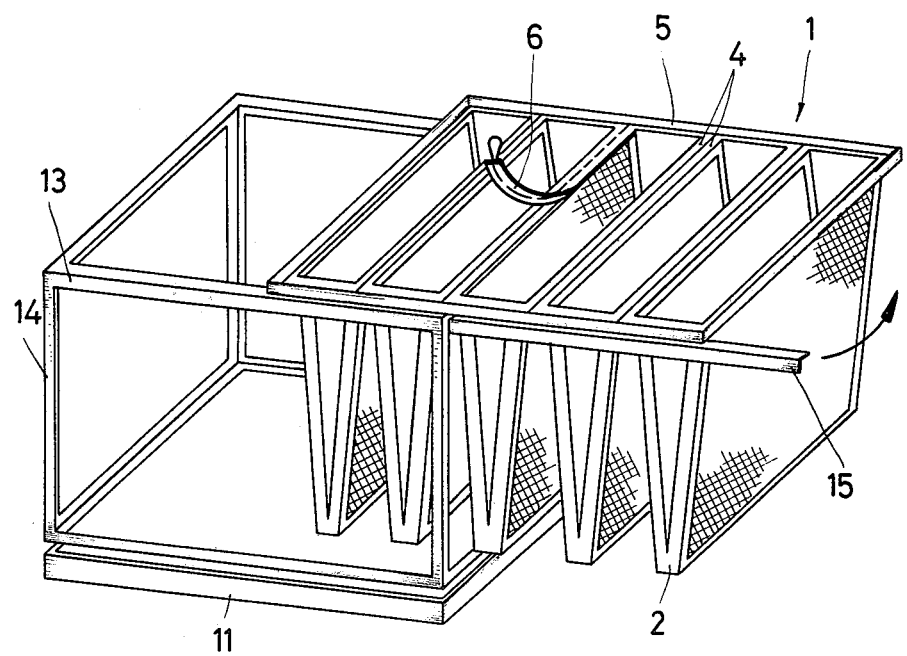
FIG. 4 is a view in accordance of FIG. 3 for a frame which was constructed of structural irons with an upper structural brace which is flipped to the side and with a filter element which is pulled out half way.

FIG. 4 corresponds with FIG. 3 except that a receiving frame 13 is constructed from structural irons 14 where one of the upper structural frame braces 15 is swung to the side in order to insert the filter element 1. Strips of sealant material, which are equipped with a tear string or adhesive tapes 6, are attached to the adjacent edges of the flange 4 of the filter pockets 2 in such a way that, by operating the tear string, the connection between adjacent filter pockets 2 can be released. After insertion of the filter element 1, the structural brace 15 is flipped back in the direction of the arrow such that the receiving frame 13 is closed again.

Figure 5:
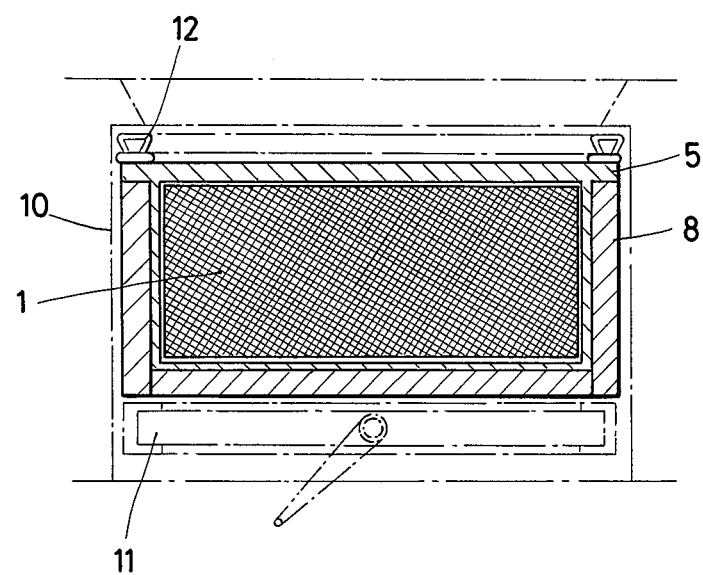
FIG. 5 is a frontal view of the filter body which was formed by the receiving frame and the filter element and which was inserted into a filter housing where the filter receiving housing and the tightening device of the receiving housing which is located below the receiving frame is shown with a dotted line.

FIG. 5 illustrates a receiving frame 8 with a filter element 1, which is inserted into it, and a filter element and receiving housing 10 which is shown by a dotted line. Below the receiving frame 8 a tightening device 11 for the housing 10 is located. The receiving frame and the self-tightening mounting 5 of the filter element 1 are lifted up and pressed towards the gasket of a known fluted test frame 12, by means of the upper edge of the receiving frame 8, by means of which fluted test frame 12 the tight contact of the mounting frame 5 of the pocket shaped filter element 1 with the housing 10 can be tested.

Figure 6:
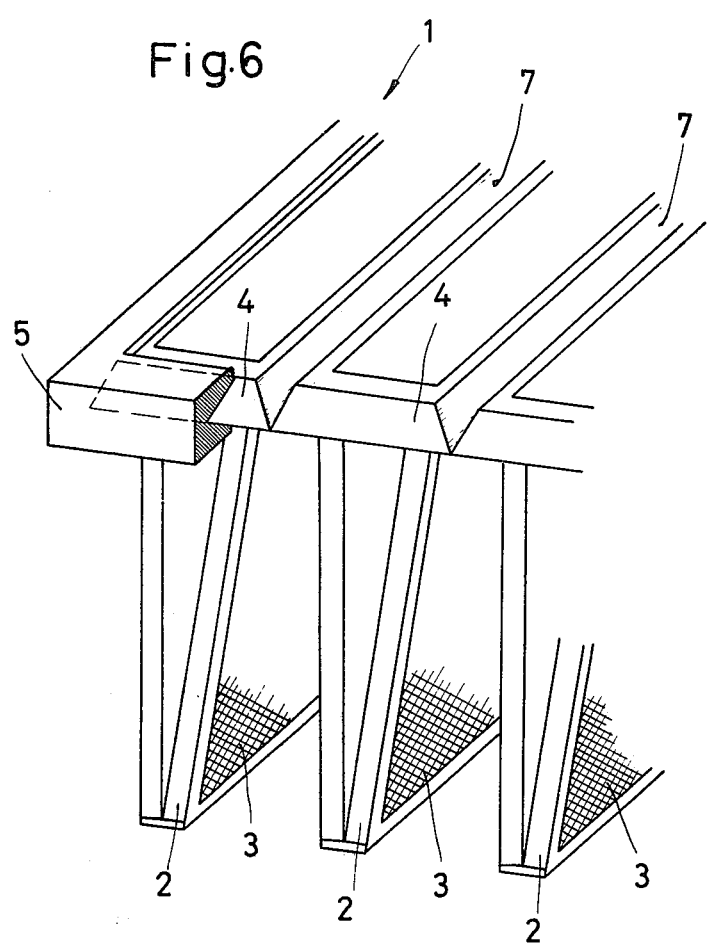
FIG. 6 is a perspective, partial view of the filter element with its tightening upper mounting frame and the grooves or V-shaped separating joints between the filter pockets which are filled with sealant.

FIG. 6 illustrates a perspective view of the filter element 1 wherein the side areas of the filter pockets 2 receive the filter layers 3. The open side of each filter pocket 2 is surrounded by a closed flange 4 where two adjacent flanges 4 form a groove or separating joint 7 which is filled with a plastic sealant material in such a way that the filter pockets 2 are tightly and elastically connected with each other at the circumference of the filter element 1. The self-sealing mounting frame 5 is attached by sealing with plastic material, which mounting frame 5 tightly surrounds the outer sides of the flanges 4 on both sides.

Figure 7:
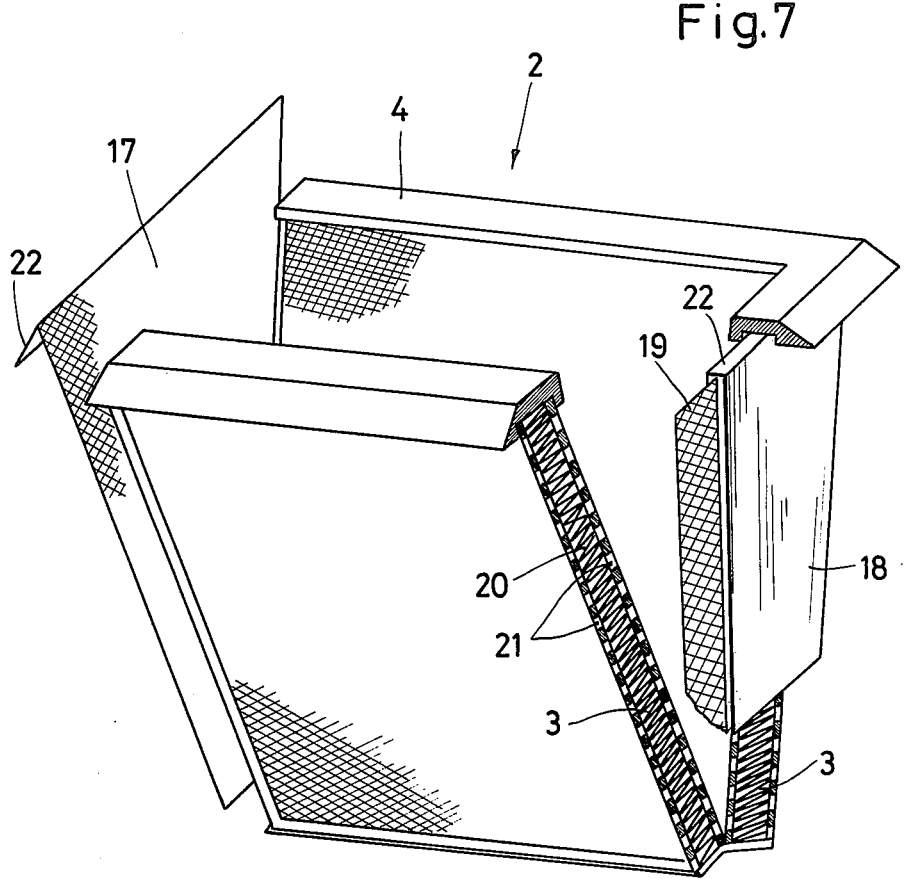
FIG. 7 is a perspective view of a filter pocket in partially fractured view in order to show clearly the reinforced plastic sealant side parts with the arrangement of the filter layers in the form of pockets.

FIG. 7 illustrates a perspective, fractured view of the filter pockets 2 and the filter layer 3 which are formed of filter paper 20 arranged in a zig-zag fashion. The filter layers 3 are located at both the V-shaped, tapered off sides of the filter pockets 2. Both sides are equipped with perforated protective covers 21 which prevent damage to the filter paper 20 from touching during handling. The V-shaped frontal sides of the filter pockets 2 are closed by supports 17, which supports 17 are equipped with a drain 18 which is made of plastic. Both of the longitudinal edges of the covers 21 are equipped with vertical areas 19 which are bent over and are in intimate contact with the sealant 18 of the support 17. The upper edge of the cover 21 is equipped with a folded over area 22 which is directed towards the outside and which folded over area 22 is in intimate contact with the self-sealing mounting frame 5. In this way, the filter pocket 2 will receive a sufficient stiffness which will not effect its deformability.

Figure 8:
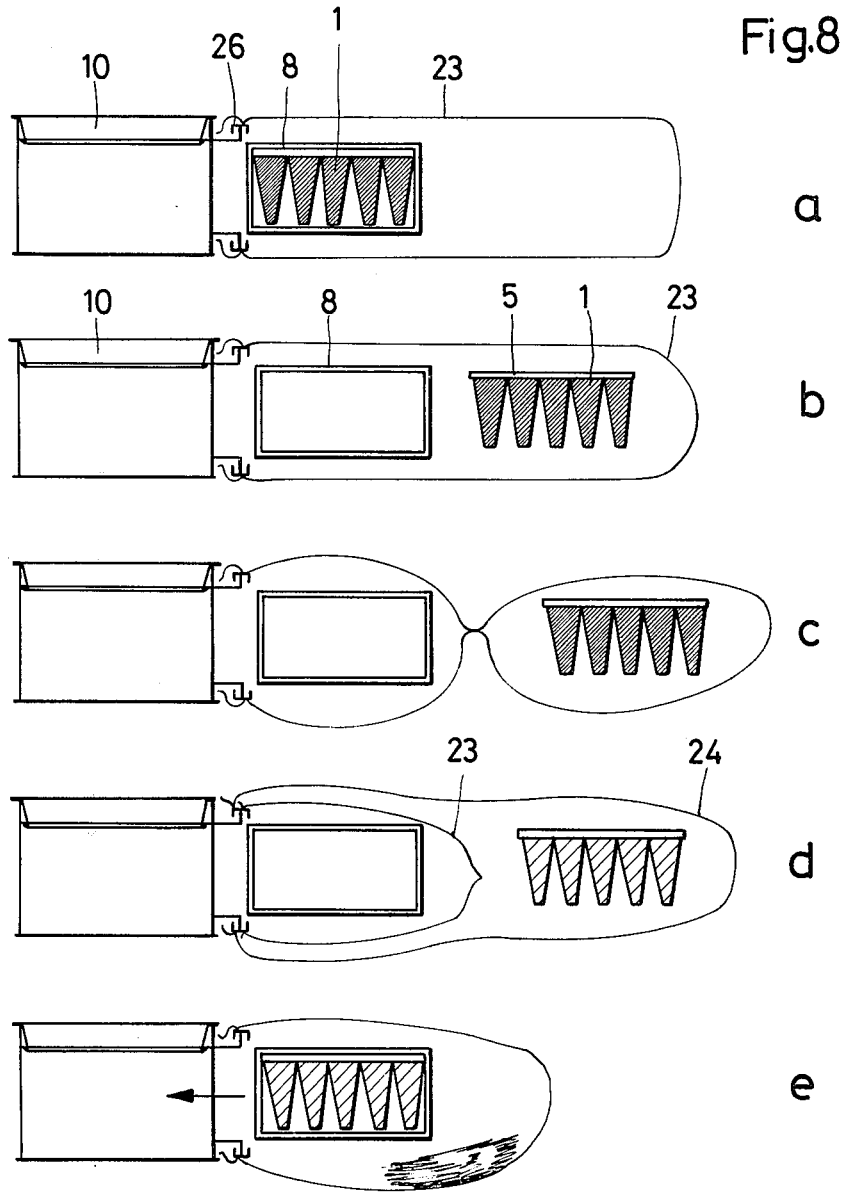
FIGS. 8a through 8e are views of the exchange of a filter element during the exchange operation employing the protective bag technique.

FIG. 8 shows the exchange of a filter element 1. The opening of the housing 10, which is necessary for the exchange of the filter element 1, is equipped with a mounting ring 26 having multiple grooves. A transparent, plastic protective bag 23 is positioned on the mounting ring 26. After the opening of the housing 10, the filter element 1 and the corresponding receiving frame 8 are pulled off the housing 10. Then the receiving frame 8 is separated from the filter element 1 within the bag 23 as shown in FIG. 8b, and the part of the bag 23 which encloses the filter element 1 is disposed of as described above. Then another bag 24, which contains a new filter element 1, is put onto the mounting ring 26 and the remainder of the bag 23 which encloses the receiving frame 8 is pulled from the mounting ring into the bag 24, and the new filter element 1 is inserted into the receiving frame 23 as shown in FIGS. 8d and 8e. Then the new filter element 1 can be inserted into the filter receiving housing 10. The opening of the housing 10 can be closed and the protective bag 24 can be removed.

Figure 9:
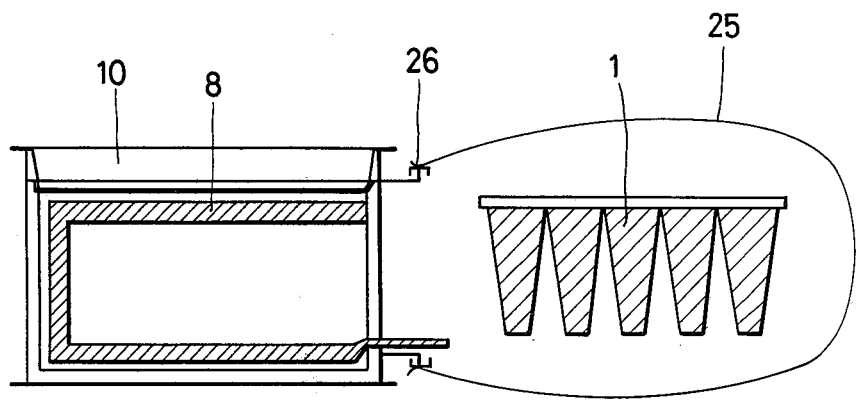
FIG. 9 is a modified view in accordance with FIG. 8, however, where the receiving frame remains in the housing and the frontal section is flipped down.

FIG. 9 shows another method of the exchange of the filter element 1. Again a protective bag 25 is put onto the mounting ring 26 whereupon the filter receiving housing 10 is opened and the receiving frame 8, which remains in the housing 10 and which contacts the tightening device of the housing 10, is also opened and the contaminated filter element 1 is pulled into a protective bag 23, which is not shown, whereupon the bag 23 is sealed off and separated. Then another protective bag 25, which contains a new filter element 1, is put onto the mounting ring 26. The remainder of the bag, which is not shown, is removed and the new filter element 1 is inserted into the receiving frame 8, whereupon the receiving frame 8 and the wall of the housing 10 are closed.

Figure 10:
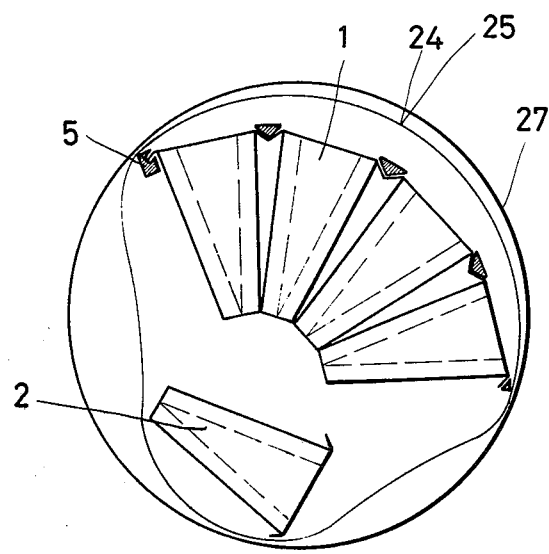
FIG. 10 is a schematic view of a filter element which was bent in the shape of a circle and broken, which filter element was put into the waste container and which filter element can be shaped by a vertical pressure from a press.

FIG. 10 shows a schematic view of a waste drum 27, as viewed from the top, into which the filter element 1 is inserted which was previously shaped to form a circle or which was separated in the protective bag 24 or 25. Before insertion of the filter element 1 into the waste container 27, a filter pocket 2 is, for instance, separated by application of pressure from both sides, and the filter element 1 is shaped in the way which is shown in FIG. 10 where the lower ends of the filter pocket 2 touch each other by means of bending away of the mounting frame 5 in such a way that the filter element 1 assumes an approximately half-circle shape which matches the inner circumference of the waste container 27. The separated filter pocket 2 can be inserted into the inner circle-shaped bend of the filter element 1, whereupon a second filter element 1, which has been shaped in a similar way, can be inserted next to the first filter element 1 into the waste container 27. Then the filter element 1 and filter pocket 2 are reduced by one-third of their original volume in the drum by being subjected to a vertical pressure by means of a press, whereupon further correspondingly shaped filter elements 1 can be inserted into the waste container 27 and can be reduced in their volume to such an extent that approximately four standard filter elements 1 with the dimensions 610×610×292 milimeters can be pressed completely into a 200 liter capacity standard waste container. After the waste container 27 is filled, it is closed and stored in a safe place. In this way the filter elements 1 can immediately, after insertion into the protective bag 24, be put into the waste container 27 and can be shaped or compacted without decontamination time or elaborate prior work, such as compaction or otherwise, by means of power saws, shredders and compacting presses which were necessary to date. A decontamination of the filter receiving frame 8 which remains in the housing is not necessary or is necessary only for a general cleaning, for reasons which were described above. In this way the filter receiving frame 8 can always remain in the housing 10 during the exchange in accordance with FIG. 9.

What is claimed is as follows:

1. An exchangeable filter element especially for nuclear installations for the purification of gas streams which contain toxic or radioactive matter, said filter element comprising a rigid frame closed on all sides and adapted to be inserted into a filter housing, said filter element further comprising a filter element for removing suspended matter; means sealing said filter element in said frame, said filter element being removable from said frame, said filter element being reduced in volume by means of pressure after said removal, said filter element further comprising a plurality of individual, V-shaped filter pockets which are arranged side by side, said filter pockets having flanges surrounding the open sides of these filter pockets and being removable, said flanges of all V-shaped pockets being gas tight and enclosed by a common encirculating mounting frame, which mounting frame consists of elastic breakable material, the encirculating edge of which mounting frame being tightly insertable in the housing which serves to receive the filter and where the filter pockets are freely suspended.

2. The filter element defined in claim 1 characterized by the fact that the filter pockets show two layers of filter paper which has been folded in a zig-zag fashion and which shows a thickness of ten to forty milimeters and which filter pockets have edges which form the open sides of the pockets embedded in and sealed to the flanges and are sealed by a common seal at their opposite edges which touch each other; and that the side areas of the filter pockets are closed by means of a V-shaped support which has been filled with a plastic material, and which V-shaped support consists of a piece of metal or a piece of cardboard or a sheet of plastic or other material, which V-shaped support is tightly embedded into the flange of the pocket and which closes the edges of both filter layers.

3. The filter element defined in claim 2 characterized by the fact that the filter layers of the filter pockets are equipped at their outer sides and at their inner sides, each with one perforated protective cover consisting of a perforated sheet of steel or similar material, the edges of which protective cover are embedded into the sealant of the flanges and of the V-shaped supports by means of bends.

4. The filter element in claim 1 characterized by the fact that the touching edges of the flanges of the V-shaped filter pockets are connected with adhesive tape, which adhesive tape is equipped with a tear strip.

5. The filter element in claim 1 characterized by the fact that the flanges of the V-shaped filter pockets contact one another to form recessed, V-shaped separating seams which are filled with an elastic sealant.

6. The filter element defined in claim 1 characterized by the fact that the receiving frame of the filter element is shaped in the form of a structural frame box which is opened on both sides, and the front of which structural frame box can be flipped down and can be locked in position for the purpose of insertion of the filter element.

7. The filter element as defined in claim 1 characterized by the fact that the receiving frame consists of a frame which is opened on all sides, has the shape of a box and is made of structural material, and the upper frontal structural connection of which frame can be flipped down sideways and can be locked in position for the insertion of the element.

* * * * *